United States Patent
Ohno et al.

(10) Patent No.: US 9,919,673 B2
(45) Date of Patent: Mar. 20, 2018

(54) VEHICLE OCCUPANT PROTECTION DEVICE

(71) Applicant: TOYOTA JIDOSHA KABUSHIKI KAISHA, Toyota-shi, Aichi-ken (JP)

(72) Inventors: Mitsuyoshi Ohno, Miyoshi (JP); Shinichi Ishida, Kiyosu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/282,767

(22) Filed: Sep. 30, 2016

(65) Prior Publication Data

US 2017/0136976 A1 May 18, 2017

(30) Foreign Application Priority Data

Nov. 18, 2015 (JP) .................................. 2015-225720

(51) Int. Cl.
| | |
|---|---|
| *B60R 21/207* | (2006.01) |
| *B60R 21/013* | (2006.01) |
| *B60R 21/2338* | (2011.01) |
| *B60R 21/262* | (2011.01) |
| *B60N 2/48* | (2006.01) |

(Continued)

(52) U.S. Cl.
CPC .......... *B60R 21/207* (2013.01); *B60N 2/4885* (2013.01); *B60R 21/013* (2013.01); *B60R 21/2338* (2013.01); *B60R 21/262* (2013.01); *B60R 2021/0048* (2013.01); *B60R 2021/0273* (2013.01); *B60R 2021/161* (2013.01);

(Continued)

(58) Field of Classification Search
CPC . B60R 21/207; B60R 21/013; B60R 21/2338; B60R 21/262; B60R 2021/23386; B60R 2021/0048; B60R 2021/2074; B60R 2021/0273; B60R 2021/161; B60N 2/4885

See application file for complete search history.

(56) References Cited

U.S. PATENT DOCUMENTS 3,753,576 A * 8/1973 Gorman ................. B60R 21/207
 280/730.1
3,795,412 A * 3/1974 John ....................... B60R 21/08
 180/274

(Continued)

FOREIGN PATENT DOCUMENTS

| | | |
|---|---|---|
| DE | 198 59 988 A1 | 6/2000 |
| JP | 2000-344044 A | 12/2000 |

(Continued)

*Primary Examiner* — Darlene P Condra
(74) *Attorney, Agent, or Firm* — Oliff PLC

(57) ABSTRACT

A vehicle occupant protection device that includes: an airbag that is constructed as an integrated bag body that covers a head portion of a vehicle occupant and includes a forward-deploying portion, and a pair of left and right side-deploying portions which are connected to the forward-deploying portion and deploy in both left and right sides of the head portion, and that is housed in a folded state in an upper portion of a vehicle seat; an inflator that supplies gas to the airbag; and an airbag moving mechanism that causes the airbag to move from the upper portion of the vehicle seat over the head portion to the seat front side, so that a front end portion of the airbag is disposed further to the seat front side than a head top portion of the vehicle occupant who is seated in a normal state.

7 Claims, 8 Drawing Sheets

(51) Int. Cl.
*B60R 21/00* (2006.01)
*B60R 21/02* (2006.01)
*B60R 21/16* (2006.01)

(52) U.S. Cl.
CPC ............. *B60R 2021/2074* (2013.01); *B60R 2021/23386* (2013.01)

(56) References Cited

U.S. PATENT DOCUMENTS

| | | | | |
|---|---|---|---|---|
| 3,953,049 | A * | 4/1976 | Surace | B60R 21/08 280/730.1 |
| 5,588,672 | A * | 12/1996 | Karlow | B60R 21/232 280/730.1 |
| 6,158,812 | A * | 12/2000 | Bonke | B60N 2/4805 297/216.12 |
| 7,878,531 | B2 * | 2/2011 | Sugimoto | B60R 21/207 280/730.1 |
| 8,353,529 | B2 * | 1/2013 | Tomitaka | B60R 21/231 280/730.1 |
| 9,533,651 | B1 * | 1/2017 | Ohno | B60R 21/23138 |
| 2013/0015642 | A1 * | 1/2013 | Islam | B60R 21/207 280/730.1 |
| 2013/0087995 | A1 * | 4/2013 | Lee | B60R 21/214 280/728.2 |
| 2014/0327234 | A1 * | 11/2014 | Heurlin | B60R 21/207 280/730.1 |
| 2016/0121839 | A1 * | 5/2016 | Ko | B60R 21/233 280/730.1 |
| 2016/0167613 | A1 * | 6/2016 | Farooq | B60R 21/231 280/730.1 |
| 2017/0129439 | A1 * | 5/2017 | Taguchi | B60R 21/205 |

FOREIGN PATENT DOCUMENTS

| | | |
|---|---|---|
| JP | 2007-230395 A | 9/2007 |
| JP | 2013-018378 A | 1/2013 |

* cited by examiner

VEHICLE OCCUPANT PROTECTION DEVICE

CROSS-REFERENCE TO RELATED APPLICATION

This application is based on and claims priority under 35 USC 119 from Japanese Patent Application No. 2015-225720 filed on Nov. 18, 2015, the disclosure of which is incorporated by reference herein.

BACKGROUND

Technical Field

The present disclosure relates to a vehicle occupant protection device.

Related Art

An airbag device is known (see Japanese Patent Application Laid-Open (JP-A) No. 2000-344044) that, in the event of a collision, supplies gas from an inflator through a gas supply pipe that is fixed to a seat back to a bag that is attached to the gas supply pipe, and causes this bag to inflate so as to cover a front and sides of a head portion of a vehicle occupant. In addition, an airbag device is known (see JP-A No. 2013-018378) in which an airbag for a head portion is deployed towards the front at left and right end portions of a seat headrest, and join together at the front surface of the vehicle occupant head portion, while an auxiliary airbag for a head portion is deployed towards the front from a central portion of the seat headrest so as to join with the pair of head portion airbags. In addition to these, a structure in which an airbag that inflates so as to cover the front and sides of the head portion of a vehicle occupant is housed in a seat back is disclosed in German Patent Application Publication No. 19859988A1.

In the structure disclosed in JP-A No. 2000-344044, because the gas supply pipe is provided such that it protrudes above the seat back, it has an unattractive appearance and the gas supply pipe is an obstruction when the vehicle seat is being operated.

On the other hand, in the structure disclosed in JP-A No. 2013-018378, it is difficult to guarantee a satisfactory mutual join strength between the pair of head portion airbags that are joined together after being inflated and deployed, or a satisfactory join strength in when the auxiliary head portion airbag is joined to the pair of head portion airbags.

As a measure to counter such drawbacks, consideration may be given to employing a structure in which an airbag that is formed as an integrated bag body is housed in an upper portion of a vehicle seat, and this airbag is inflated and deployed so as to cover the head portion of a vehicle occupant from the front and from both the left and right sides. However, there is a possibility that, upon being supplied with gas, the airbag will become caught on the head portion of the vehicle occupant or on the vehicle cabin ceiling or the like as it passes over the headrest and the vehicle occupant, and there is room for improvement from the standpoint of improving the deployment performance of the airbag.

SUMMARY

In consideration of the above-described circumstances, the present disclosure provides a vehicle occupant protection device that, in a structure in which an airbag which is constructed as an integrated bag body is housed in a folded state in an upper portion of a vehicle seat, makes it possible to improve the deployment performance of the airbag.

A vehicle occupant protection device according to a first aspect of the present disclosure includes an airbag that is inflated and deployed upon being supplied with gas, and that is constructed as an integrated bag body that covers a head portion of a vehicle occupant and includes a forward-deploying portion which deploys in an area which includes a front of the head portion, and a pair of left and right side-deploying portions which are connected to the forward-deploying portion and deploy in an area which includes both left and right sides of the head portion, and that is housed in a folded state in an upper portion of a vehicle seat, an inflator that is provided in an upper portion of the vehicle seat and supplies gas to the airbag when a vehicle collision is detected, and an airbag moving mechanism that, when it is determined that a vehicle collision is unavoidable, causes the airbag to move from the upper portion of the vehicle seat over the head portion towards the seat front side, so that a front end portion of the airbag is disposed further to the seat front side than a head top portion of the vehicle occupant who is seated in a normal state.

In the vehicle occupant protection device according to the first aspect of the present disclosure, the airbag is housed in a folded state in a top portion of a vehicle seat, and this airbag is inflated and deployed upon receiving a supply of gas from an inflator. Because the airbag is constructed as an integrated bag body that covers a head portion of a vehicle occupant and includes a forward-deploying portion and a pair of left and right side-deploying portions, it is possible to restrain and protect the head portion of the vehicle occupant by means of this airbag in various different types of collision.

Moreover, when it is determined that a vehicle collision is unavoidable, the airbag is moved by an airbag moving mechanism from the upper portion of the vehicle seat towards the seat front side. Here, a front end portion of the airbag that has been moved by the airbag moving mechanism is disposed further to the seat front side than a head top portion of the vehicle occupant who is seated in a normal state. As a consequence, when gas is supplied from the inflator to the airbag during a vehicle collision, because the front end portion of the airbag is inflated and deployed after traveling over the head portion of the vehicle occupant, it is possible to prevent the airbag from becoming caught on the head portion of the vehicle occupant or on the vehicle cabin ceiling or the like during this inflation and deployment. Note that the 'normal state' referred to here is a state in which a World SID (Internationally integrated side impact dummy: World Side Impact Dummy) AM50 (i.e., the 50th percentile of American adult males) dummy is seated in a standard sitting posture that is determined using a collision test method.

A vehicle occupant protection device according to a second aspect of the present disclosure is characterized in that, in the structure according to the first aspect, after the airbag moving mechanism has moved the airbag to the seat front side, if it is determined that the vehicle collision has been avoided, the airbag moving mechanism moves the airbag back to the upper portion of the vehicle seat.

In the vehicle occupant protection device according to the second aspect of the present disclosure, after it has been determined that a vehicle collision is unavoidable, after waiting for a predetermined time or the like to elapse, if it is determined that the vehicle has avoided the collision, gas is not supplied from the inflator to the airbag, and the airbag is not inflated or deployed. The airbag can then be rehoused by the airbag moving mechanism in the folded state in the top portion of the seat.

A vehicle occupant protection device according to a third aspect of the present disclosure is characterized in that, in the structure according to the first and second aspects, there are further provided diffuser tubes that are disposed in parallel with the airbag and supply the gas generated by the inflator to the forward-deploying portion and the side-deploying portions, and, when it is determined that a vehicle collision is unavoidable, the airbag moving mechanism causes the diffuser tubes to move to the seat front side together with the airbag.

In the vehicle occupant protection device according to the third aspect of the present disclosure, because the gas generated by the inflator is supplied to the forward-deploying portion and the side-deploying portions via the diffuser tubes, the forward-deploying portion and the side-deploying portions can be inflated and deployed efficiently. Moreover, because the diffuser tubes are moved together with the airbag, then provided that the diffuser tubes are rigid, it is possible to prevent the airbag from going out of shape while it is being moved.

A vehicle occupant protection device according to a fourth aspect of the present disclosure is characterized in that, in the structure according to any one of the first through third aspects, a strap that, during the inflation and deployment of the airbag, restricts movement of the side-deploying portions towards the seat front is joined to the side-deploying portions.

In the vehicle occupant protection device according to the fourth aspect of the present disclosure, it is possible to prevent the inflated and deployed side-deploying portions from separating from the headrest and moving towards the vehicle front.

As has been described above, according to the vehicle occupant protection device according to the first aspect of the present disclosure, the excellent effect is achieved that, in a structure in which an airbag which is constructed as an integrated bag body is housed in a folded state in an upper portion of a vehicle seat, it is possible to improve the deployment performance of the airbag.

According to the vehicle occupant protection device according to the second aspect of the present disclosure, the excellent effect is achieved that it is possible to prevent the field of view of a vehicle occupant being obstructed by an airbag when it is determined that a vehicle collision has been avoided.

According to the vehicle occupant protection device according to the third aspect of the present disclosure, the excellent effect is achieved that it is possible to improve the deployment performance of an airbag compared to a structure in which a diffuser tube is not provided.

According to the vehicle occupant protection device according to the fourth aspect of the present disclosure, the excellent effect is achieved that it is possible to inflate and deploy side-deploying portions over an appropriate protection range.

BRIEF DESCRIPTION OF THE DRAWINGS

Exemplary embodiments of the present disclosure will be described in detail based on the following figures, wherein.

DETAILED DESCRIPTION

Figure 1:
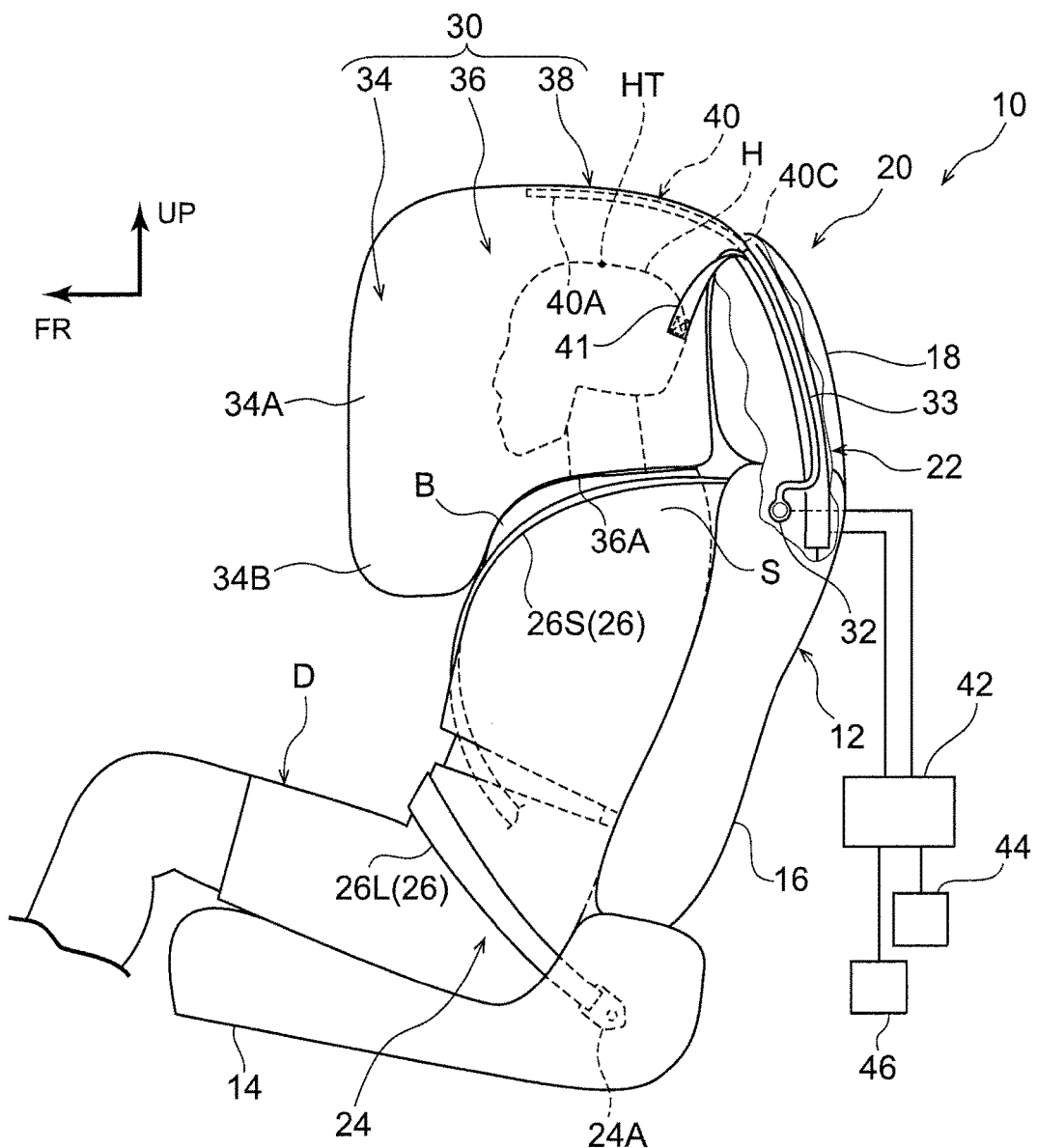
FIG. 1 is a partially cut away side view showing in typical form an operating state of a vehicle occupant protection device according to an exemplary embodiment.

A vehicle occupant protection apparatus 10 according to an exemplary embodiment of the present disclosure will now be described based on FIG. 1 through FIG. 7. Note that an arrow FR and an arrow UP that are shown where appropriate in the drawings respectively indicate a forward direction of a vehicle seat 12 (i.e., a direction in which a seated person faces), and an upward direction. Hereinafter, unless specifically stated otherwise, if simple front-rear, up-down, or left-right directions are used, then these refer respectively to the front-rear directions of the seat, the up-down directions of the seat, and the left-right directions when facing towards the front in the seat front-rear direction. Note also that, in the exemplary embodiment, the front-rear direction of the vehicle seat 12 matches the front-rear direction of a vehicle, the up-down direction of the vehicle seat 12 matches the up-down direction of a vehicle, and the seat transverse direction of the vehicle seat 12 matches the vehicle transverse direction. Furthermore, an arrow IN which is shown where appropriate in the drawings shows a vehicle center side in the vehicle transverse direction of an automobile that is serving as a vehicle in which the vehicle seat 12 has been installed.

(Overall Schematic Structure of a Vehicle Occupant Protection Device)

As is shown in FIG. 1, the vehicle occupant protection device 10 is mounted in the vehicle seat 12. The vehicle seat 12 is disposed in a position that is offset to either the left side or right side (to the left side in the present exemplary embodiment) relative to the center in the vehicle transverse direction of a vehicle body of an automobile (not shown in the drawings). This vehicle seat 12 is constructed so as to include a seat cushion 14, a seat back 16 whose bottom end is coupled to a rear end of the seat cushion 14, and a headrest 18 that is provided at an upper end of the seat back 16. In the vehicle seat 12 of the present exemplary embodiment, a structure is employed in which the headrest 18 and the seat back 16 are formed as an integrated body.

Figure 2:
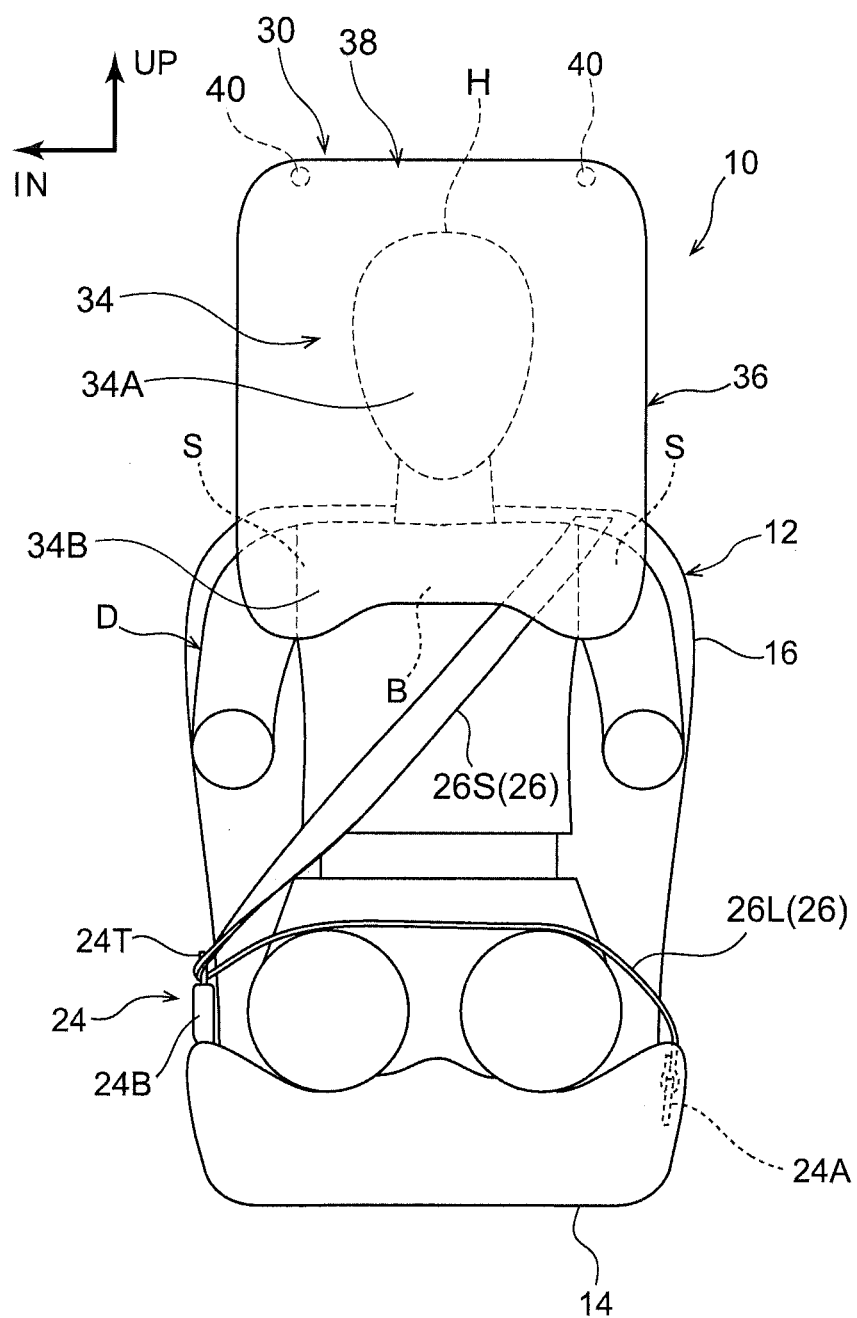
FIG. 2 is a front view showing in typical form an operating state of a vehicle occupant protection device according to an exemplary embodiment.
Figure 3:
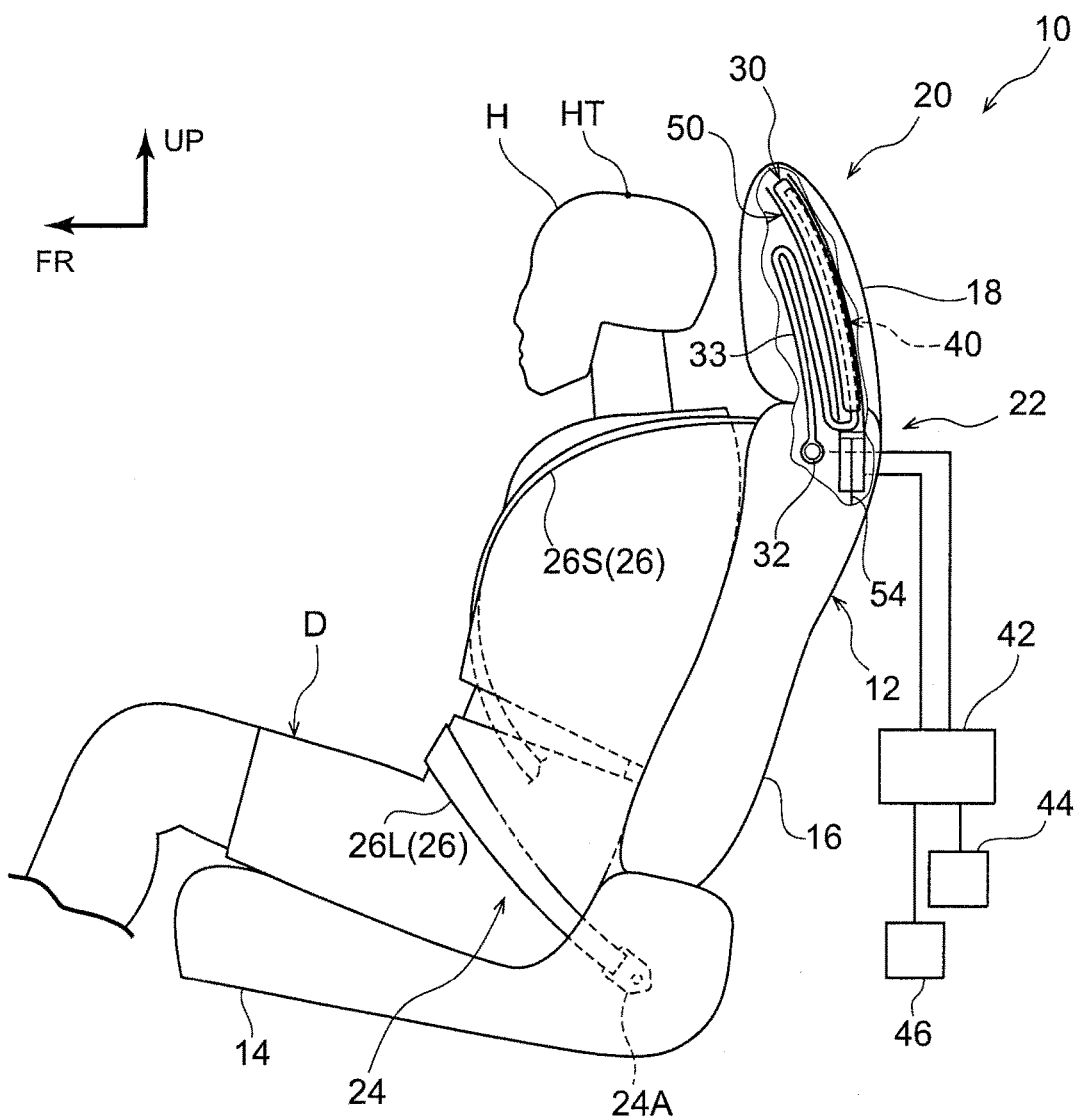
FIG. 3 is a partially cut away side view showing in typical form a pre-operating state of a vehicle occupant protection device according to an exemplary embodiment.

Note that, in FIG. 1 through FIG. 3, a state is shown in which a collision test dummy D is seated on the seat cushion 14 of the vehicle seat 12 so as to serve as a model of the vehicle occupant who is to be protected. This dummy D is, for example, a WorldSID AM50. This dummy D is seated in a standard sitting posture (i.e., in a normal state) that is determined using a collision test method. The vehicle seat 12 is located in a reference set position that corresponds to the aforementioned sitting posture. Note that a head portion H shown in the drawings is a portion above the neck, and including the face, of the dummy D, and the face of the dummy D faces towards the vehicle forward side (i.e., the seat front side). Hereinafter, the dummy D will be referred to as the 'vehicle occupant D' in order to simplify the description.

The vehicle occupant protection device 10 is constructed so as to include a multidirectional airbag device 20 that is intended to protect the vehicle occupant D from various types of collision, an airbag moving mechanism 22, and a seatbelt device 24. Hereinafter, the schematic structure of the seatbelt device 24 will be described, and thereafter the structures of the multidirectional airbag device 20 and the airbag moving mechanism 22 will be described in detail.

As is shown in FIG. 2, the seatbelt device 24 is a three-point type of seatbelt device. One end of a belt (i.e., a webbing) 26 is retractably wound onto a retractor (not shown in the drawings), while another end of the belt 26 is fixed to an anchor 24A. A tongue plate 24T is provided such that it is able to slide along the belt 26, and the vehicle occupant D puts on the belt 26 by engaging this tongue plate 24T with a buckle 24B. When the belt 26 is being worn by the vehicle occupant D, it includes a shoulder belt 26S that fits around an upper body of the vehicle occupant D, and a lap belt 26L that extends from the tongue plate 24T to the anchor 24A and fits around the waist portion of the vehicle occupant D.

In the present exemplary embodiment, the seatbelt device 24 is formed as what is known as a 'seatbelt device with attached seat' in which the retractor (not shown in the drawings), the anchor 24A, and the buckle 24B are provided on the vehicle seat 12. Moreover, in this exemplary embodiment, when operated, the retractor also has a pretensioner function whereby it forcibly retracts the belt 26.

(Multi-Directional Airbag Device Structure)

As is shown in FIG. 1, the multi-directional airbag device 20 is constructed so as to include a multi-directional airbag 30, which serves as an airbag, diffuser tubes 40, and an inflator 32. As is shown in FIG. 3, the multi-directional airbag 30 is housed in a folded state in an upper portion of the vehicle seat 12, and is inflated and deployed upon being supplied with gas that is generated by the inflator 32. This is described below in detail.

As is shown in FIG. 1, the multi-directional airbag 30 is constructed as a single integrated bag body that is inflated and deployed so as to cover the front and both the left and right sides of a head portion H of the vehicle occupant D (hereinafter, this will usually be referred to simply as the 'head portion H'). More specifically, the multi-directional airbag 30 is constructed so as to include a forward-deploying portion 34 that deploys in an area that includes the front of the head portion H, a pair of left and right side-deploying portions 36 that deploy in an area that includes the both the left and right sides of the head portion H, and an upward-deploying portion 38 that deploys in an area that includes the top of the head portion H.

The forward-deploying portion 34 is a deployment portion that, upon being supplied with gas, inflates and deploys at the front of the head portion H, and is constructed so as to include an upper inflating portion 34A that inflates and deploys at the front (i.e., at the front surface) of the head portion H, and a lower inflating portion 34B that inflates and deploys at the front of a breast portion B and shoulder portions S of the vehicle occupant D. A seam (not shown in the drawings), which is a non-inflating portion, is provided in the forward-deploying portion 34, and the shape of the forward-deploying portion 34 in an inflated and deployed state is maintained by this seam.

The side-deploying portions 36 are deployment portions that, upon being supplied with gas, inflate and deploy at the sides of the head portion H, and are formed in a substantially rectangular shape when seen in a side view. A seam (not shown in the drawings), which is a non-inflating portion, is provided in the side-deploying portions 36, and the shape of the side-deploying portions 36 in an inflated and deployed state is maintained by this seam.

The side-deploying portions 36 have a sufficiently large size (i.e., surface area) to enable them, in an inflated and deployed state, to wrap around substantially the entire head portion H when seen in a side view, and a lower end 36A of the side-deploying airbags 36 comes into contact with the shoulder portions S of the vehicle occupant D. In this structure, the position in the up-down direction of the multi-directional airbag 30 in an inflated and deployed state relative to (the head portion H of) the vehicle occupant D is determined by this contact of the lower portion 36A with the shoulder portions S. The multi-directional airbag 30 is constructed such that, when in this positioned state, none of the forward-deploying portion 34, the left and right side deploying portions 36, and the upward-deploying portion 38 come into contact with the head portion H of the vehicle occupant D (i.e., such that a gap is formed between them) when the vehicle occupant D is seated in the standard sitting posture.

As is shown in FIG. 2, the upward-deploying portion 38 is a deployment portion that, with the seat transverse direction taken as the longitudinal direction thereof, inflates and deploys above the head portion H, and is disposed between the pair of left and right diffuser tubes 40 (described below). A seam (not shown in the drawings), which is a non-inflating portion, is provided in the upward-deploying portion 38, and the thickness in the seat up-down direction of the upward-deploying portion 38 is restricted by this seam.

The multi-directional airbag device 30 that is constructed in the above-described manner is formed as an example as an integrated bag body by an OPW (One Piece Woven). As is shown in FIG. 3, the multi-directional airbag 30 is disposed in a folded state such that it spans across an internal portion of the headrest 18 and an internal portion of an upper end portion of the seat back 16. Note that it is also possible, for example, to form the airbag 30 as an integrated bag body by cutting and sewing peripheral edges of two pieces of woven cloth.

Here, the pair of left and right diffuser tubes 40 that supply gas to the multi-directional airbag 30 are disposed inside the multi-directional airbag 30. As is shown in FIG. 1, the diffuser tubes 40 are hollow tubes that are formed substantially in a circular arc shape when seen in a side view, and are formed by metal tubes in the present exemplary embodiment. The diffuser tubes 40 extend in the seat front-rear direction above the head portion H when the multi-directional airbag 30 is in an inflated and deployed state, and one end portion 40A of each diffuser tube 40 is disposed on the seat front side of a head top portion HT of the vehicle occupant D.

Figure 6:
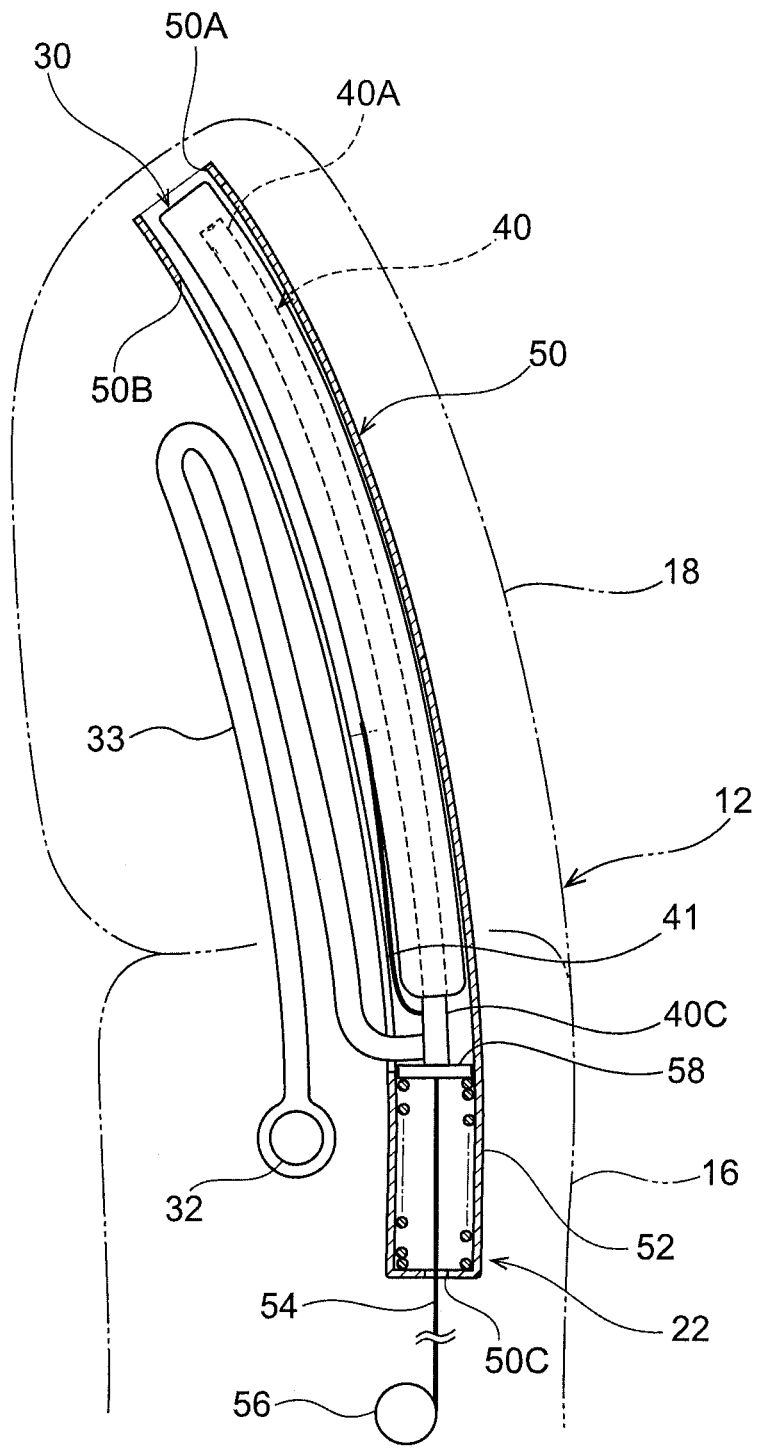
FIG. 6 is an enlarged typical side view illustrating a movement process of an airbag moving mechanism that forms part of the vehicle occupant protection device according to an exemplary embodiment, and shows a state in which an airbag is housed in a headrest.

Furthermore, other end portion 40C of each diffuser tube 40 is located inside the headrest 18. As is shown in FIG. 6, when the multi-directional airbag 30 is in a housed state, the other end portion 40C of the diffuser tube 40 protrudes to the outside of this multi-directional airbag 30, and a gas supply tube 33 (described below) is connected to this other end portion 40C. Here, the diffuser tubes 40 are constructed such that they are able to move between an operating position shown in FIG. 1 and a storage position shown in FIG. 3, and are constructed such that they can be moved relatively between the operating position and the storage position by the airbag moving mechanism 22. The airbag moving mechanism 22 is described below.

One end portion of a strap 41 is fixed to the other end portion 40C of the diffuser tubes 40. The strap 41 is formed in an elongated belt shape, and another end portion of the strap 41 is attached to the side-deploying portions 36 of the multi-directional airbag 30. Because of this, the other end portion 40C of the diffuser 40 is joined to the side-deploying portion 36 via the strap 41. In addition, as is shown in FIG. 1, when the multi-directional airbag 30 is in an inflated and deployed state, movement of the side-deploying portions 36 towards the seat front side is restricted by the strap 41.

Figure 5A:
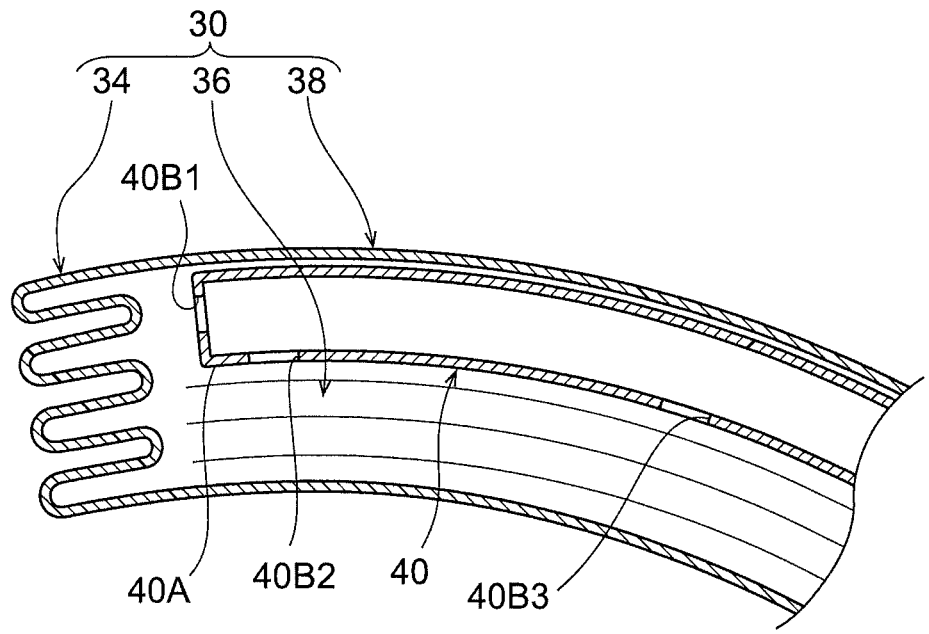
FIG. 5A is an enlarged cross-sectional view as seen from a seat transverse direction showing an enlargement of a front end portion of the airbag shown in FIG. 4.

As is shown in FIG. 5A, plural air supply ports 40B1, 40B2, and 40B3 are formed in the diffuser tubes 40. The air supply port 40B1 is formed in a front end surface of the diffuser tube 40 that faces towards the seat front side when the diffuser tube 40 is located in the operating position, and gas is supplied from the diffuser tube 40 to the forward-deploying portion 34 via the air supply port 40B1.

The air supply port 40B2 is formed in a lower surface of the front end portion of the diffuser tube 40 when the diffuser tube 40 is located in the operating position, and gas is supplied from the diffuser tube 40 to the forward-deploying portion 34 and the side-deploying portions 36 via the air supply port 40B2.

The air supply port 40B3 is formed in a lower surface of the diffuser tube 40 closer to the headrest 18 side (i.e., the seat rear side) than the air supply port 40B2 when the diffuser tube 40 is located in the operating position. Gas is supplied from the diffuser tube 40 to the side-deploying portions 36 via the air supply port 40B3. Note that other air supply ports (not shown in the drawings) in addition to the air supply ports 40B1, 40B2, and 40B3 are also formed in the diffuser tubes 40, and gas is supplied to the forward-deploying portion 34 and the side-deploying portions 36 via plural air supply ports.

Figure 5B:
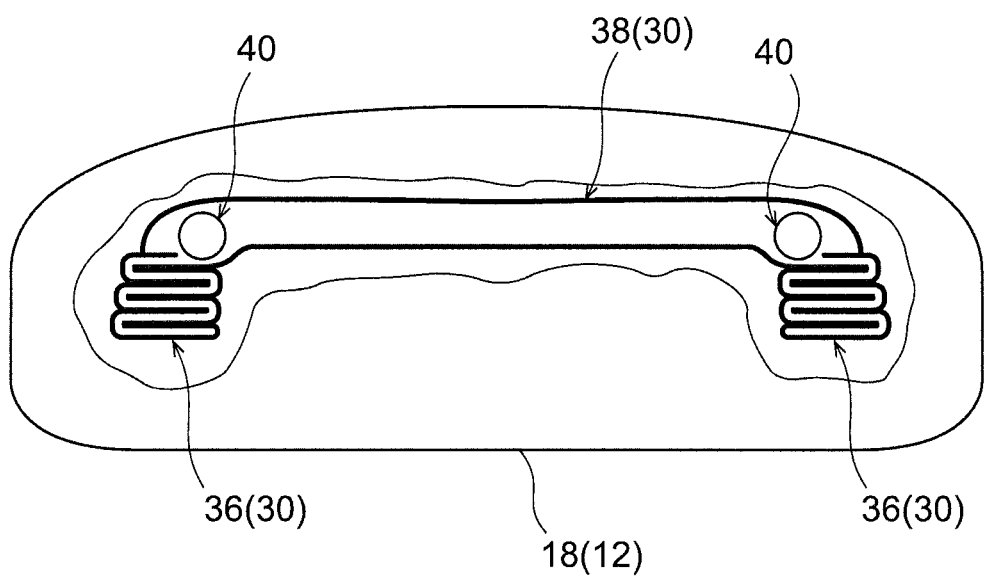
FIG. 5B is an enlarged cross-sectional view taken along a line 5B-5B in FIG. 4.

The forward-deploying portion 34 forming part of the multi-directional airbag 30 is folded in a bellows fold at the front of the one end portion 40A of the diffuser tube 40 that is formed in the manner described above. Moreover, as is shown in FIG. 5A and FIG. 5B, the side-deploying portions 36 are folded in a bellows fold so as to run alongside the diffuser tube 40 underneath the diffuser tube 40. When the forward-deploying portion 34 and the side-deploying portions 36 have been folded in a bellows fold, they are covered by packaging cloth (not shown in the drawings) so that the folded state of the multi-directional airbag 30 is maintained. When gas is supplied to the multi-directional airbag 30, the packaging cloth (not shown in the drawings) is ruptured by the deployment pressure of the multi-directional airbag 30, and the multi-directional airbag 30 is inflated and deployed.

As is shown in FIG. 1, the inflator 32 is provided above the vehicle seat 12 and, in the present exemplary embodiment, is disposed inside the top end portion of the seat back 16. A combustion-type or cold gas-type of inflator is employed as the inflator 32, and the gas that is generated as a result of the inflator 32 being operated is supplied to the interior of the multi-directional airbag 30. The inflator 32 of the present exemplary embodiment is a cylinder-type of inflator, and is disposed such that a longitudinal direction thereof extends in the seat transverse direction.

Furthermore, as is shown in FIG. 6, the gas supply tube 33 is connected to the inflator 32. The gas supply tube 33 is formed as a flexible, tubular body, and the inflator 32 and diffuser tubes 40 are mutually joined together via the gas supply tube 33. A structure is created in which the gas generated from the inflator 32 flows via the gas supply tube 33 to the diffuser tubes 40. Note that operations of the inflator 32 are controlled by an ECU (Electronic Control Unit) 42 serving as a control device.

(Structure of Airbag Moving Mechanism)

Next, the airbag moving mechanism 22 will be described. As is shown in FIG. 6, the airbag device 22 is constructed so as to include a guide tube body 50, a baseplate 58, a compression coil spring 52, a wire 54, and a retractor motor 56.

The guide tube body 50 is a circular tube-shaped component having one closed end, and whose longitudinal direction extends in the seat up-down direction. The multi-directional airbag 30 is housed in a folded state inside this guide tube body 50 together with the diffuser tubes 40. An aperture 50A is formed in an upper end portion of the guide tube body 50. The aperture 50A is positioned in an upper portion of the headrest 18, and a structure is created that enables the multi-directional airbag 30 and the diffuser tubes 40 to move both upward and forwards through this aperture 50A.

A guide groove 50B is formed in a wall surface on the seat front side of the guide tube body 50. The guide groove 50B is wide enough to enable the gas supply tube 33 to be inserted therein, and is formed extending from a lower portion to the upper portion of the guide tube body 50. The gas supply tube 33 is inserted into the guide groove 50B and is connected to the other end portion 40C of a diffuser 40. The gas supply tube 33 is formed having sufficient length to enable it to follow the movement of the diffuser tube 40. Because of this, a structure is created in which, in conjunction with the movement of the diffuser tubes 40 from the storage position to the operating position, an end portion of the gas supply tube 33 is able to move along the guide tube body 50 while being guided by the guide groove 50B.

When the diffuser tubes 40 are positioned in the storage position, the baseplate 58 is disposed inside the lower portion of the guide tube body 50. The baseplate 58 is formed in a flat, plate shape whose thickness direction extends in the seat up-down direction, and the other end 40C of each diffuser tube 40 is fixed to this baseplate 58.

The compression coil spring 52 is provided underneath the baseplate 58. The compression coil spring 52 is disposed between a bottom portion of the guide tube body 50 and the baseplate 58 and, when the diffuser tubes 40 are positioned in the storage position, the compression coil spring 52 is in a compressed state. A locking mechanism (not shown in the drawings) is provided in the guide tube body 50, and this anchors the baseplate 58. Because of this, prior to the airbag moving mechanism 22 being operated, the compression coil spring 52 is held in a state of compression and urges the baseplate 58 upwards.

One end portion of the wire 54 is attached to the baseplate 58. The wire 54 extends in the seat up-down direction, and the one end portion of the wire 54 is attached to a lower surface of the baseplate 58 inside the guide tube body 50. Another end portion of the wire 54 is inserted through an insertion hole 50C that is formed in the bottom portion of the guide tube body 50, and extends downwards, and is then wound onto the retractor motor 56 that is provided inside the seat back 16.

The retractor motor 56 is a motor that, when driven, winds up the wire 54. In this structure, when the baseplate 58 is moved upwards so as to apply tension to the wire 54, the wire 54 is pulled off the retractor motor 56 (i.e., in the direction of the arrow A in FIG. 7). Note that the retractor motor 56 and the locking mechanism (not shown in the drawings) that anchors the baseplate 58 are electrically connected to the ECU 42, and operations thereof are controlled by the ECU 42.

The airbag moving mechanism 22 is constructed in the above-described manner. As is shown in FIG. 3 and FIG. 6, when the locking mechanism of the baseplate 58 is released from the state in which the diffuser tubes 40 are positioned in the storage position, the baseplate 58 is pushed upwards along the guide tube body 50 by the urging force of the compression coil spring 52.

Figure 7:
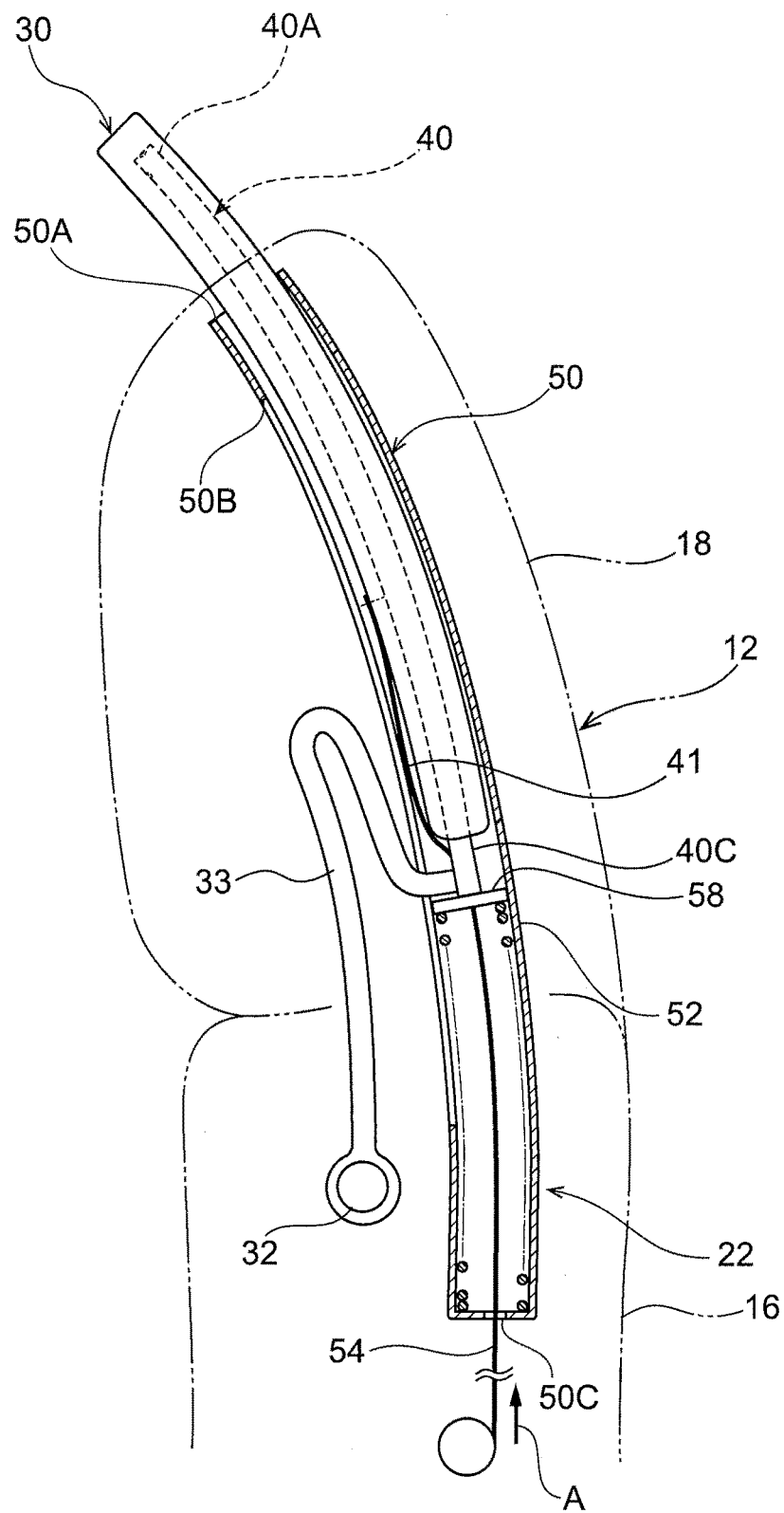
FIG. 7 is a view corresponding to FIG. 6 showing a state partway through a movement of an airbag towards the seat front side.

As is shown in FIG. 7, as a result of the baseplate 58 being pushed upwards, the diffuser tubes 40 that are fixed to the baseplate 58 are moved upwards and forwards through the aperture 50A in the guide tube body 50. At this time, a sewn portion that is easily ruptured is set in the upholstery of the headrest that is positioned above the guide tube body 50, and the multi-directional airbag 30 and the diffuser tubes 40 are able to rupture this sewn portion and move to the outside of the headrest 18.

Figure 4:
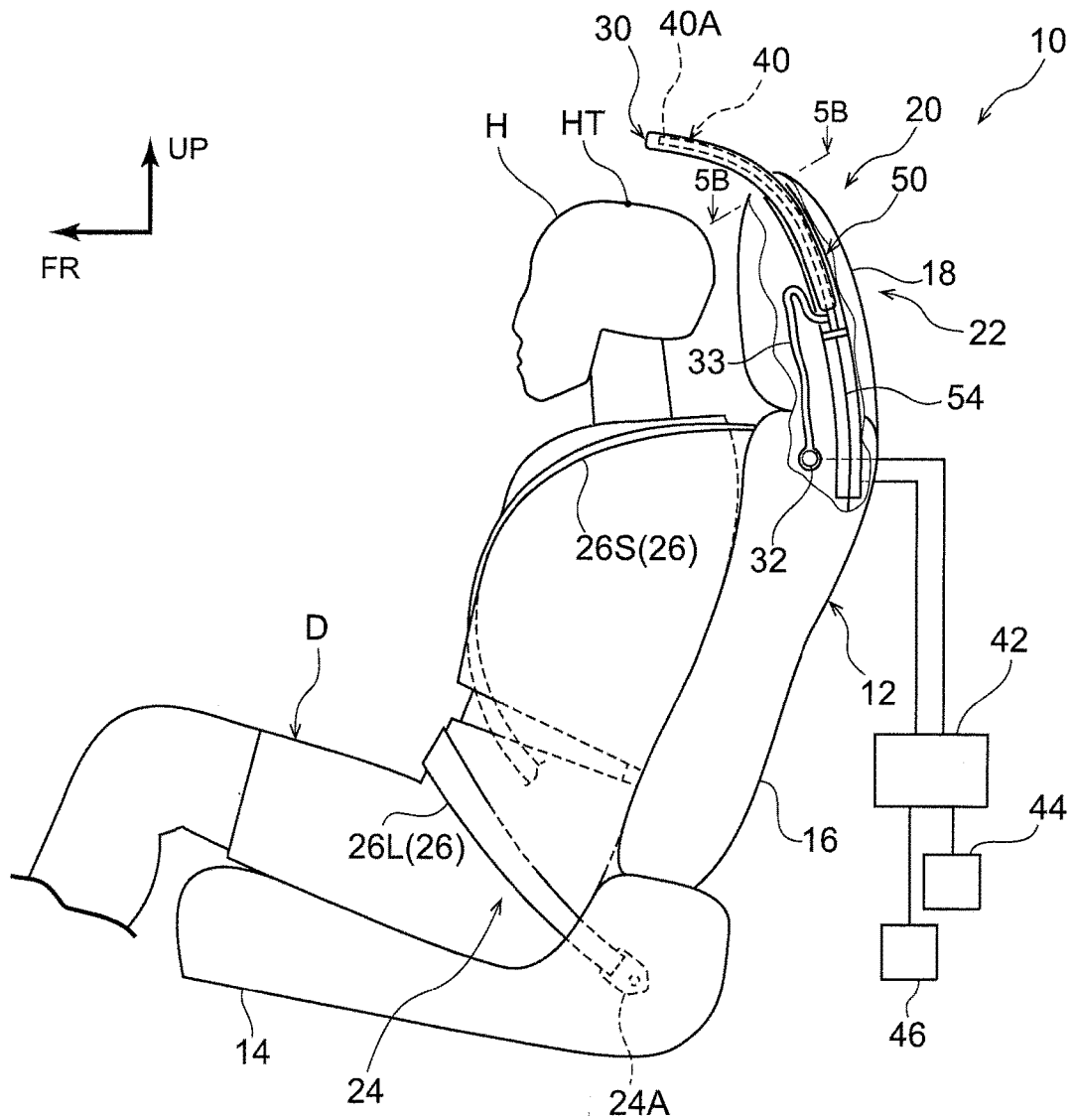
FIG. 4 is a view corresponding to FIG. 3 showing a state partway through a movement of an airbag from the state shown in FIG. 3 towards a seat front side.

As is shown in FIG. 4, the multi-directional airbag 30 and the diffuser tubes 40 are moved towards the seat front side over the top of the head portion H of the vehicle occupant D. The movement of the multi-directional airbag 30 and the diffuser tubes 40 is stopped in the operating position (see FIG. 1) where a front end portion of the multi-directional airbag 30 (i.e., the one end portion 40A of the diffuser tubes 40) is disposed on the seat front side of the head top portion HT of the vehicle occupant D. Note that a known mechanism can be employed as the mechanism used to stop the movement of the multi-directional airbag 30 and the diffuser tubes 40. As an example of this, a structure may be employed in which a stopper for the baseplate 58 is provided in an internal wall adjacent to the aperture 50A of the guide tube body 50, and projections that support the baseplate 58 are provided in the internal wall of the guide tube body 50 so as to be located further than the stopper from the aperture 50A. In this case, partway during the movement of the multi-directional airbag 30 and the diffuser tubes 40 to the operating position, the baseplate 58 rides over the projections and moves to the operating position side. Once the baseplate 58 strikes the stopper at the operating position, because any downward drop due to its own weight is supported by the projections, the multi-directional airbag 30 and the diffuser tubes 40 can be stopped at the operating position.

(ECU Structure)

The inflator 32 and the airbag moving mechanism 22 of the multi-directional airbag device 20 are electrically connected to the ECU 42. Moreover, the ECU 42 is also electrically connected to a collision prediction sensor 44 such as a pre-crash sensor and to a collision sensor 46. Furthermore, the ECU 42 is also electrically connected to a retractor (not shown in the drawings) that forms part of the seatbelt device 24.

Based on signals from the collision prediction sensor 44, the ECU 42 is able to predict whether or not various types of collision are unavoidable for that vehicle. When the ECU has determined based on a signal from the collision prediction sensor 44 that a vehicle collision is unavoidable, it operates the airbag moving mechanism 22. Specifically, the ECU releases the locked state of the baseplate 58 and causes the multi-directional airbag 30 and the diffuser tubes 40 to be moved by the urging force of the compression coil spring 52 from the storage position to the operating position. Note that the collision prediction sensor 44 is constructed so as to include a stereo camera (not shown in the drawings) that is provided adjacent to the center in the vehicle transverse direction of an upper portion of the windshield glass. An area in the front of the vehicle is photographed by this stereo camera, and objects that may collide with the vehicle are detected. In addition, the distance to a collision object detected by the stereo camera, and the relative speed between the vehicle and the collision object are also measured, and this measurement data is output to the ECU 42. Based on this measurement data from the stereo camera, the ECU 42 determines whether or not a collision with the vehicle is unavoidable. Note that a milliwave radar or the like may be used for the collision prediction sensor 44.

When the ECU 42 has detected a vehicle collision based on a signal from the collision sensor 46, it causes a pretension mechanism of a retractor (not shown in the drawings) to be operated, and also causes the inflator 32 to be operated. As a consequence, gas generated by the inflator 32 is supplied to the diffuser tubes 40 via the gas supply tube 33, and this gas is then supplied from the diffuser tubes 40 to the forward-deploying portion 34 and the side-deploying portions 36 of the multi-directional airbag 30. Note that, as an example, the collision sensor 46 is constructed so as to include a front satellite sensor that is formed by an acceleration sensor that is disposed on a front side bumper, and a floor sensor that is formed by an acceleration sensor that is disposed on the floor underneath the center console.

In contrast, after it has been determined that a vehicle collision is unavoidable based on a signal from the collision prediction sensor 44, then, for example, after waiting for a predetermined time or the like to elapse, if it is determined that the vehicle has avoided the collision, the ECU 42 causes the retractor motor 56 of the airbag moving mechanism 22 to be operated. As a consequence, the wire 54 is moved in the opposite direction from the direction shown by the arrow A in FIG. 7, the wire 54 is wound onto the retractor motor 56, and the baseplate 58 is moved towards the bottom portion side of the guide tube body 50 while resisting the urging force of the compression coil spring 52. Once the baseplate 58 has been returned to the position shown in FIG. 6, the baseplate 58 is anchored by the locking mechanism. In this manner, the multi-directional airbag 30 is returned to (i.e., is housed in) the storage position in the upper portion of the vehicle seat 12 together with the diffuser tubes 40 without having been inflated and deployed. Note that it is possible to employ a structure in which the distance to the vehicle traveling in front, or the distance to a peripheral obstacle is detected, and if this distance becomes greater than a predetermined value (i.e., if this distance increases), then it is determined that the vehicle collision has been avoided.

(Operation and Effects)

Next, an operation of the exemplary embodiment will be described.

In the vehicle occupant protection device 10 of the present exemplary embodiment, when it is determined based on a signal from the collision prediction sensor 44 that a vehicle collision is unavoidable, the multi-directional airbag 30 and the diffuser tubes 40 are moved to the operating position by the airbag moving mechanism 22. Namely, the multi-directional airbag 30 and the diffuser tubes 40 are moved from the upper portion of the headrest 18 (i.e. the vehicle seat 12) upwards and towards the front, and the front end portion of the multi-directional airbag 30 is disposed on the seat front side of the head top portion HT of the vehicle occupant D who is seated in a normal state (see FIG. 1). As a consequence, when gas is supplied from the inflator 32 to the multi-directional airbag 30 based on a signal from the collision sensor 46, the front end portion of the multi-directional airbag 30 travels over the head portion H of the vehicle occupant D and, in this state, the multi-directional airbag 30 can be inflated and deployed. As a result of this, it is possible to prevent the multi-directional airbag 30 from becoming caught on the head portion H of the vehicle occupant D or on the vehicle cabin ceiling or the like during this inflation and deployment, and the deployment performance of the multi-directional airbag 30 can be improved.

Moreover, in the vehicle occupant protection device 10 of the present exemplary embodiment, when it is determined that a vehicle collision has been avoided, the inflator 32 is not operated (i.e., gas is not supplied from the inflator 32 to the multi-directional airbag 30), and the multi-directional airbag 30 is not inflated and deployed. As a consequence, when a vehicle collision is avoided, it is possible to prevent the field of view of a vehicle occupant from being obstructed by the multi-directional airbag 30.

Furthermore, in the vehicle occupant protection device 10 of the present exemplary embodiment, when it is determined that a vehicle collision has been avoided, the multi-directional airbag 30 and the diffuser tubes 40 are moved from the operating position to the storage position by the airbag moving mechanism 22, and are housed in the upper portion of the vehicle seat 12. As a consequence, the multi-directional airbag 30 remains housed in a folded state. As a result, if it is subsequently determined once again that a vehicle collision is unavoidable, the multi-directional airbag 30 and the diffuser tubes 40 are moved to the operating position by the airbag moving mechanism 22, and can be made ready for this new vehicle collision.

Furthermore, in the vehicle occupant protection device 10 of the present exemplary embodiment, a structure is employed in which a portion of the diffuser tubes 40 is disposed inside the multi-directional airbag 30, and the multi-directional airbag 30 and the diffuser tubes 40 are moved to the operating position by the airbag moving mechanism 22. As a consequence, the gas that is generated by the inflator 32 can be supplied via the diffuser tubes 40 to the forward-deploying portion 34 and the side-deploying portions 36, and the forward-deploying portion 34 and side deploying portions 36 can consequently be inflated and deployed efficiently. Moreover, the diffuser tubes 40 that are formed from metal make it possible to prevent this multi-directional airbag 30 from going out of shape when the multi-directional airbag 30 is being moved. Namely, if the diffuser tubes 40 are not provided, or if the diffuser tubes 40 do not move, there is a possibility that, having been moved to the operating position, the front end portion of the multi-directional airbag 30 will droop downwards, and it will be difficult for the multi-directional airbag 30 to inflate and deploy in the predetermined position. In contrast to this, in the present exemplary embodiment, the rigid diffuser tubes 40 make it possible to prevent the multi-directional airbag 30 from losing its shape, and the multi-directional airbag 30 can be inflated and deployed in a desired position.

Moreover, in the vehicle occupant protection device 10 of the present exemplary embodiment, because the diffuser tubes 40 and the side-deploying airbags 36 are joined to each other by the strap 41, when the multi-directional airbag 30 is in an inflated and deployed state, movement of the side-deploying portions 36 towards the seat front side is limited by the tensile force of the strap 41. As a consequence, the side-deploying airbags can be inflated and deployed in the correct protection range for the vehicle occupant D.

Furthermore, in the vehicle occupant protection device 10 of the present exemplary embodiment, because a structure is employed in which the multi-directional airbag 30 is constructed as an integrated bag body that includes the forward-deploying portion 34 and the side-deploying portions 36 and that protects the head portion H of the vehicle occupant D, it is possible to restrain and protect the vehicle occupant D in various different types of collision.

Moreover, in the vehicle occupant protection device 10 of the present exemplary embodiment, the multi-directional airbag 30 is housed in an upper portion of the vehicle seat 12. Because of this, compared with a structure in which, for example, a gas supply pipe that is disposed so as to surround the head portion of a vehicle occupant from above protrudes at all times into the vehicle cabin interior, it is possible to improve the pre-operating appearance, while guaranteeing a level of vehicle occupant protection equal to or surpassing that provided by the above structure. Moreover, adjustment of the front-rear position, adjustment of the height, and reclining operations of the vehicle seat 12 are not obstructed by the multi-directional airbag device 20.

(Variant Example of the First Exemplary Embodiment)

Note that, as is shown in FIG. 6 and FIG. 7, in the airbag moving mechanism 22 of the present exemplary embodiment, the multi-directional airbag 30 and the diffuser tubes 40 are moved as a result of the baseplate 58 being pushed upwards by the urging force of the compression coil spring 52, however, the present disclosure is not limited to this. For example, it is also possible to employ the structure of the variant example shown in FIG. 8.

Figure 8:
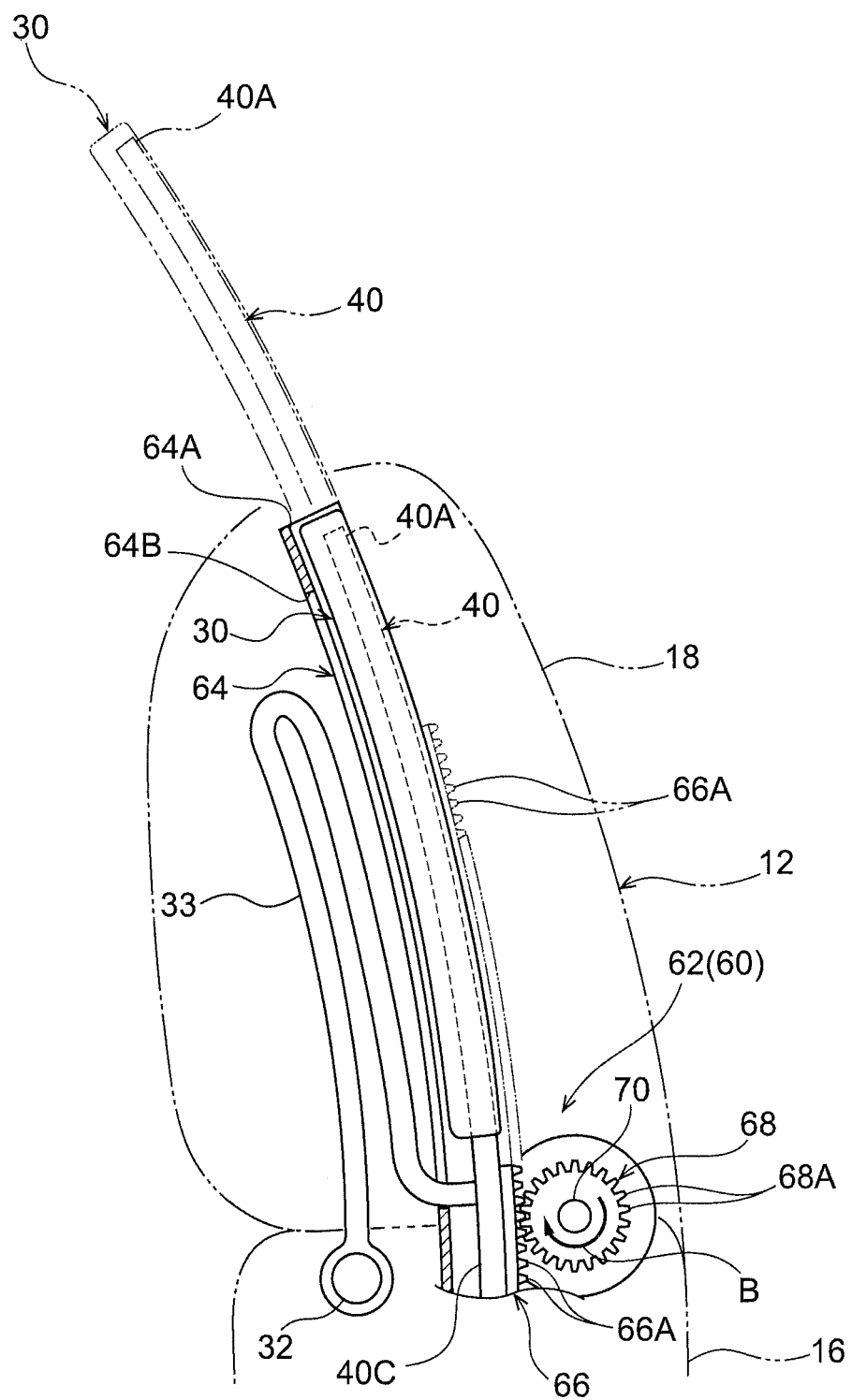
FIG. 8 is an enlarged typical side view showing a variant example of an airbag moving mechanism forming part of the vehicle occupant protection device according to an exemplary embodiment.

As is shown in FIG. 8, an airbag moving mechanism 62 that forms part of a vehicle occupant protection device 60 according to the present variant example, is formed by a rack-and-pinion mechanism. Specifically, the airbag moving mechanism 62 is constructed so as to include a guide tube body 64, a rack gear 66, and a pinion gear 68.

The guide tube body 64 is shaped such that it supports the surface on the seat front side, and the surfaces on both sides in the vehicle transverse direction of the multi-directional airbag 30 when this is in the storage position. Namely, in a planar cross-sectional view as seen from above the seat, the guide tube body 64 is formed substantially in a U-shape that is open on the seat rear side. An aperture 64A is formed in an upper end portion of the guide tube body 64. The aperture 64A is located in an upper end portion of the headrest 18 and, in this structure, the multi-directional airbag 30 and the diffuser tubes 40 are able to move upwards and towards the front through the aperture 64A.

Furthermore, a guide groove 64B is formed in a wall surface on the seat front side of the guide tube body 64. The guide groove 64B is formed extending from a lower portion to the upper portion of the guide tube body 64, and has sufficient width for the gas supply tube 33 to be inserted therein. The gas supply tube 33 is inserted into the guide groove 64B and is connected to the other end portion 40C of a diffuser 40. Because of this, a structure is created in which, in conjunction with the movement of the diffuser tubes 40 from the storage position to the operating position, an end portion of the gas supply tube 33 is able to move along the guide tube body 64 while being guided by the guide groove 64B.

Here, in the storage position, the rack gear 66 is provided in the surface on the seat rear side of the other end portion 40C of a diffuser tube 40. Plural teeth 66A are formed at intervals from each other on the rack gear 66. Note that, in the present variant example, the diffuser tubes 40 extend further downwards than in the structure shown in FIG. 6, and the rack gear 66 is provided extending as far as the lower end portion of the diffuser tubes 40 (this is not evident in the drawings).

The pinion gear 68 is provided inside the upper portion of the vehicle seat 12. The pinion gear 68 is axially supported on a frame (not shown in the drawings) that forms part of the framework of the vehicle seat 12, and is constructed such that it is able to rotate around a rotation shaft 70. Plural teeth 68A that mesh together with the teeth 66A of the rack gear 66 are formed on the pinion gear 68. By causing the pinion gear 68 to rotate around the rotation shaft 70, the rack gear 66 is moved up or down the guide tube body 64 so that, in conjunction with the movement of the rack gear 66 from the position shown by the solid lines in the drawings to the position shown by the double-dot chain line, the diffuser tubes 40 are also moved to the position shown by the double-dot chain lines. The rotation shaft 70 of the pinion gear 68 is driven by a motor (not shown in the drawings).

In the airbag moving mechanism 62 that is constructed in the above-described manner, when it is determined that a vehicle collision is unavoidable, the pinion gear 68 is rotated by the ECU 42 via the rotation shaft 70 in the direction shown by the arrow B in FIG. 8. As a consequence of this, the rack gear 66 is moved upwards, and the multi-directional airbag 30 and the diffuser tubes 40 are moved both upwards and towards the front side along the guide tube body 64 to the operating position.

If it is determined that the vehicle collision has been avoided, the pinion gear is rotated by the ECU 42 via the rotation shaft 70 in the opposite direction from the direction shown by the arrow B in FIG. 8 without the multi-directional airbag 30 having been inflated or deployed. As a consequence of this, the rack gear 66 is moved downwards, and the multi-directional airbag 30 and the diffuser tubes 40 are moved to the storage position.

In the structure of the present variant example, because the multi-directional airbag 30 and the diffuser tubes 40 are moved using a rack-and-pinion mechanism, compared with a structure in which the compression coil 52 is used, the position of the multi-directional airbag 30 can be easily adjusted. For example, the body type and posture of the vehicle occupant may be detected by a sensor or the like (not shown in the drawings), and the position of the multi-directional airbag 30 may then be adjusted to match the body type and posture of this vehicle occupant. If this structure is employed, the multi-directional airbag 30 can be inflated and deployed in a correct protection range for the body type and posture of the vehicle occupant.

An exemplary embodiment of the present disclosure and a variant example thereof have been described above, however, it is to be understood that the present disclosure may be implemented in a variety of forms insofar as they do not depart from the spirit or scope of the present disclosure. For example, in the above-described exemplary embodiment and variant example, the headrest 18 and the seat back 16 are formed integrally with each other, and the multi-directional airbag 30 is disposed so as to span across the headrest 18 and the seat back 16, however, the present disclosure is not limited to this. The present disclosure may also be applied to a structure in which the headrest 18 and the seat back 16 are mutually independent bodies. In this case, the multi-directional airbag 30 may be disposed inside only the headrest 18. It is also possible for the multi-directional airbag 30, the diffuser tubes 40, and the airbag moving mechanism 22 to be disposed inside the headrest 18.

Moreover, in the above-described embodiment and variant example, the inflator 32 is disposed inside an upper end portion of the seat back 16, however, the present disclosure is not limited to this. For example, it is also possible to dispose the inflator 32 inside the headrest 18. Moreover, the number and placement of the inflators 32 are not limited and it is possible, for example to dispose inflators 32 vertically inside the seat back 16 such that the longitudinal direction thereof is aligned with the seat up-down direction.

Furthermore, a structure is employed in which no airbag device other than the multi-directional airbag device 20 is provided in the vehicle seat 12 of the above-described exemplary embodiment and variant example, however, the present disclosure is not limited to this. For example, it is also possible to employ a structure in which a side airbag device that is inflated and deployed on a side of the vehicle occupant D is also provided. As this side airbag device it is possible to employ a structure in which a side airbag is housed in a folded state inside the seat back 16, and when a vehicle collision is detected, the side airbag is inflated and deployed from a side portion of the seat back 16.

Furthermore, the present disclosure is not limited to a structure in which the seatbelt device 24 is provided in the vehicle seat 12, and it is also possible to employ a structure in which the retractor, anchor, buckle and the like are provided on the vehicle body. Moreover, in a structure in which the vehicle occupant protection device 10 is provided with the seatbelt device 24, then the seatbelt device 24 is not limited to being a three-point type of device, and may also be a four-point type or a two-point type of seatbelt device.

Moreover, in the above-described embodiment and variant example, an example is described in which the vehicle seat 12 is disposed such that the seat transverse direction matches the vehicle transverse direction, however, the present disclosure is not limited to this. For example, the vehicle seat 12 may also be disposed diagonally relative to the vehicle body, or may be constructed such that the orientation thereof relative to the vehicle body is able to be altered (by being rotated around a vertical axis). Because the multi-directional airbag 30 is inflated and deployed such that it covers the head portion H of the vehicle occupant D even if this type of structure is employed, this can also contribute to the superior protection of the head portion H. Moreover, because the multi-directional airbag 30 is housed in the headrest 18, it is difficult for there to be any interference between the multi-directional airbag 30 and the vehicle cabin interior surfaces or vehicle cabin interior components, and any impediment to the operation to alter the orientation of the vehicle seat 12 relative to the vehicle body can be suppressed or prevented.

What is claimed is:

1. A vehicle occupant protection device comprising:
    an airbag that is inflated and deployed upon being supplied with gas, and that is constructed as an integrated bag body configured to cover a head portion of a vehicle occupant and includes a forward-deploying portion that is configured to deploy in an area that includes a front of the head portion, and a pair of left and right side-deploying portions which are connected to the forward-deploying portion and configured to deploy in an area that includes both left and right sides of the head portion, and that is housed in a folded state in an upper portion of a vehicle seat;

an inflator that is provided in an upper portion of the vehicle seat, and supplies gas to the airbag when a vehicle collision is detected; and an airbag moving mechanism that, when it is determined that a vehicle collision is unavoidable, is configured to shift the airbag from the upper portion of the vehicle seat over the head portion to a seat front side before the airbag is deployed, so that a front end portion of the airbag is configured to be disposed further to the seat front side than a head top portion of the vehicle occupant who is seated in a normal state.

2. The vehicle occupant protection device according to claim 1, wherein, after the airbag moving mechanism has moved the airbag to the seat front side, if it is determined that the vehicle collision has been avoided, the airbag moving mechanism moves the airbag back to the upper portion of the vehicle seat.

3. The vehicle occupant protection device according to claim 1, further comprising diffuser tubes that are disposed in parallel with the airbag and supply the gas generated by the inflator to the forward-deploying portion and the side-deploying portions, wherein, when it is determined that a vehicle collision is unavoidable, the airbag moving mechanism causes the diffuser tubes to move to the seat front side together with the airbag.

4. The vehicle occupant protection device according to claim 3, wherein the diffuser tubes are rigid.

5. The vehicle occupant protection device according to claim 4, wherein the diffuser tubes are formed from metal tubes.

6. The vehicle occupant protection device according to claim 3, wherein:

airbag moving mechanism includes a guide tube body, that is a circular tube-shaped component having one closed end, and whose longitudinal direction extends in the seat up-down direction;

the airbag is housed in a folded state inside this guide tube body together with the diffuser tubes; and an aperture is formed in an upper end portion of the guide tube body in an upper portion of the vehicle seat, and a structure is created that enables the airbag and the diffuser tubes to move both upward and forwards through this aperture.

7. The vehicle occupant protection device according to claim 1, wherein a strap that, during an inflation and deployment of the airbag, restricts movement of the side-deploying portions towards the seat front is joined to the side-deploying portions.

* * * * *